Figure 1:
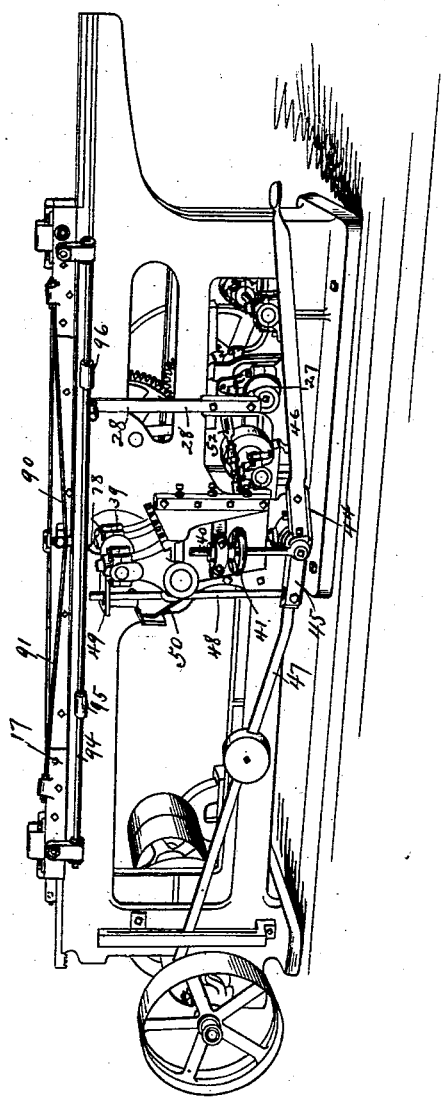

(No Model.)

J. R. THOMAS.
JOINTING MACHINE.

No. 563,097.

7 Sheets—Sheet 1.

Patented June 30, 1896.

Witnesses,

Inventor,
John R. Thomas

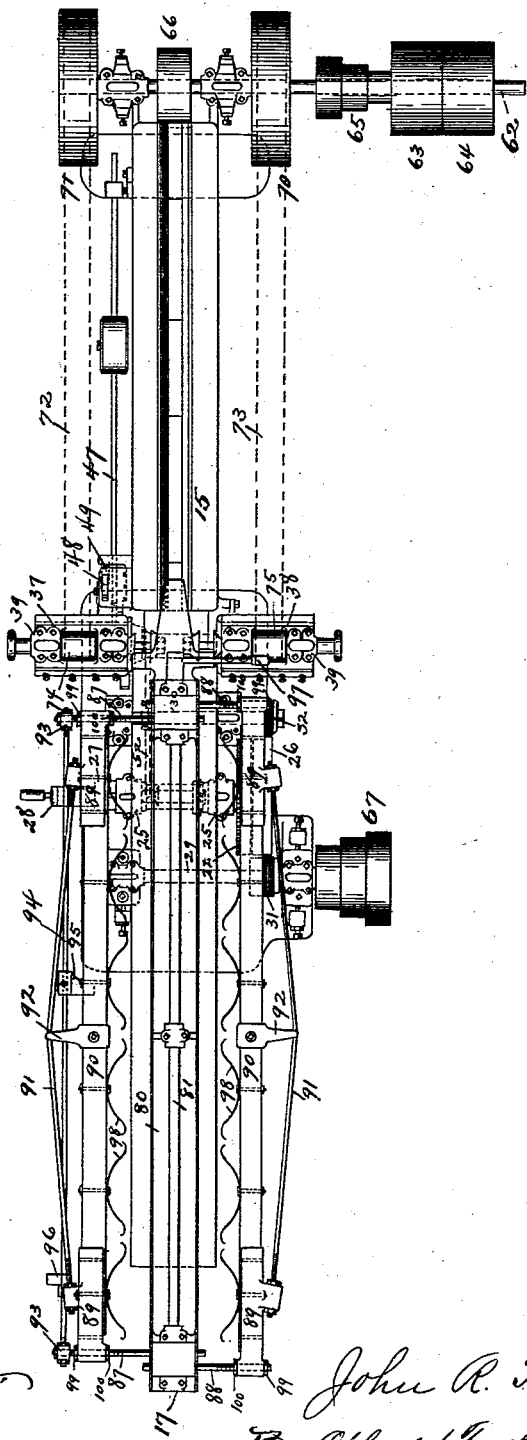

(No Model.) 7 Sheets—Sheet 3.
J. R. THOMAS.
JOINTING MACHINE.
No. 563,097. Patented June 30, 1896.
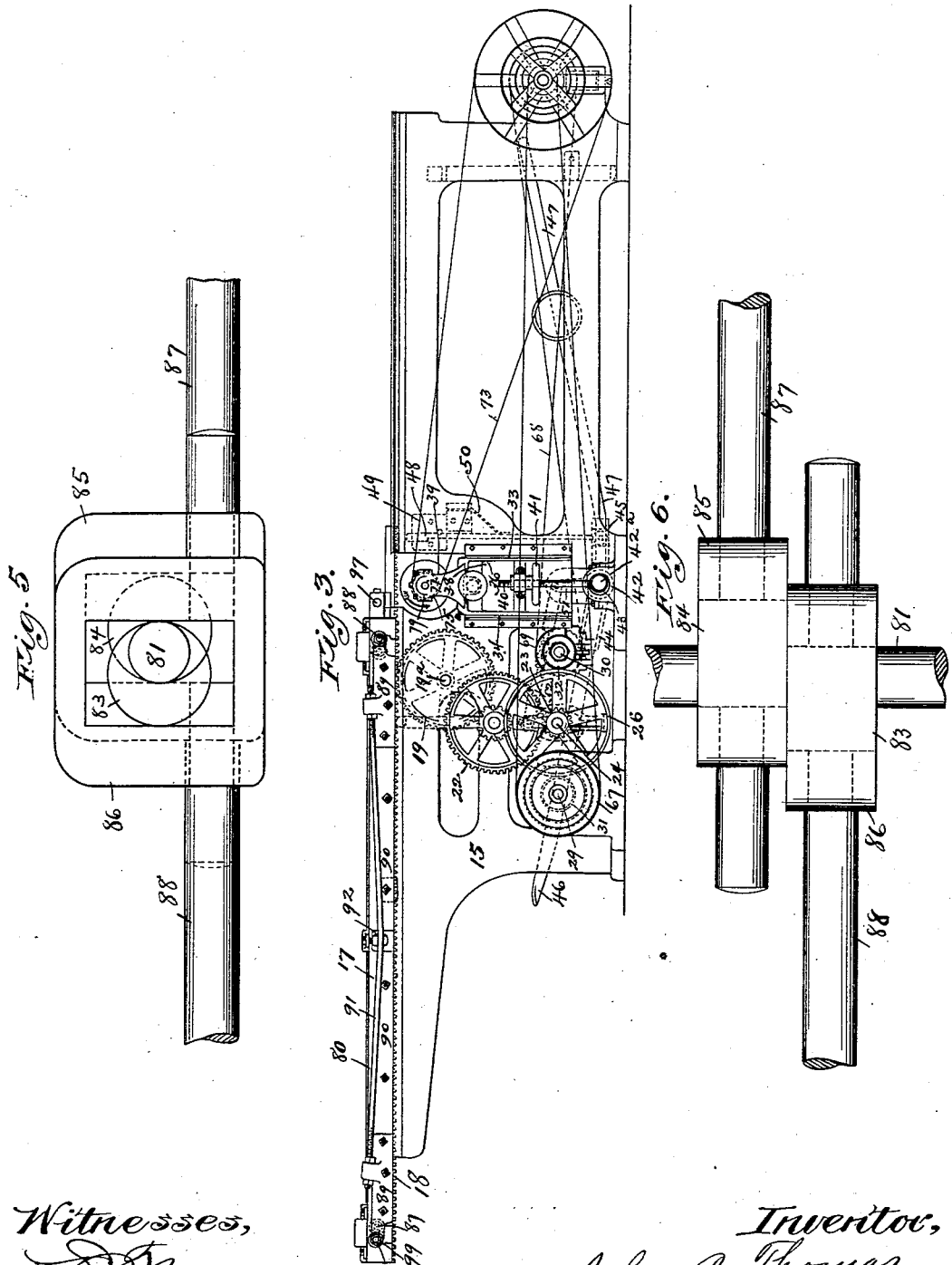
Witnesses,
Inventor,
John R. Thomas (No Model.)  7 Sheets—Sheet 4.
J. R THOMAS.
JOINTING MACHINE.
No. 563,097.  Patented June 30, 1896.
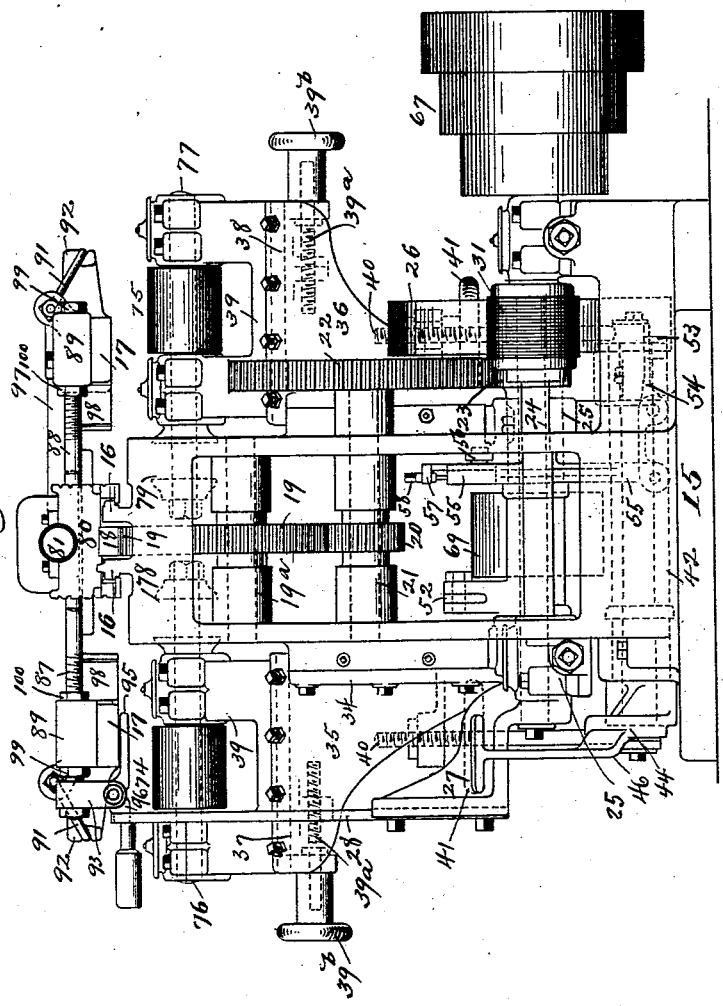
Witnesses,
Inventor,
John R. Thomas
By Offield, Towle & Linthicum
Atty's.

(No Model.) 7 Sheets—Sheet 5.
J. R. THOMAS.
JOINTING MACHINE.
No. 563,097. Patented June 30, 1896.
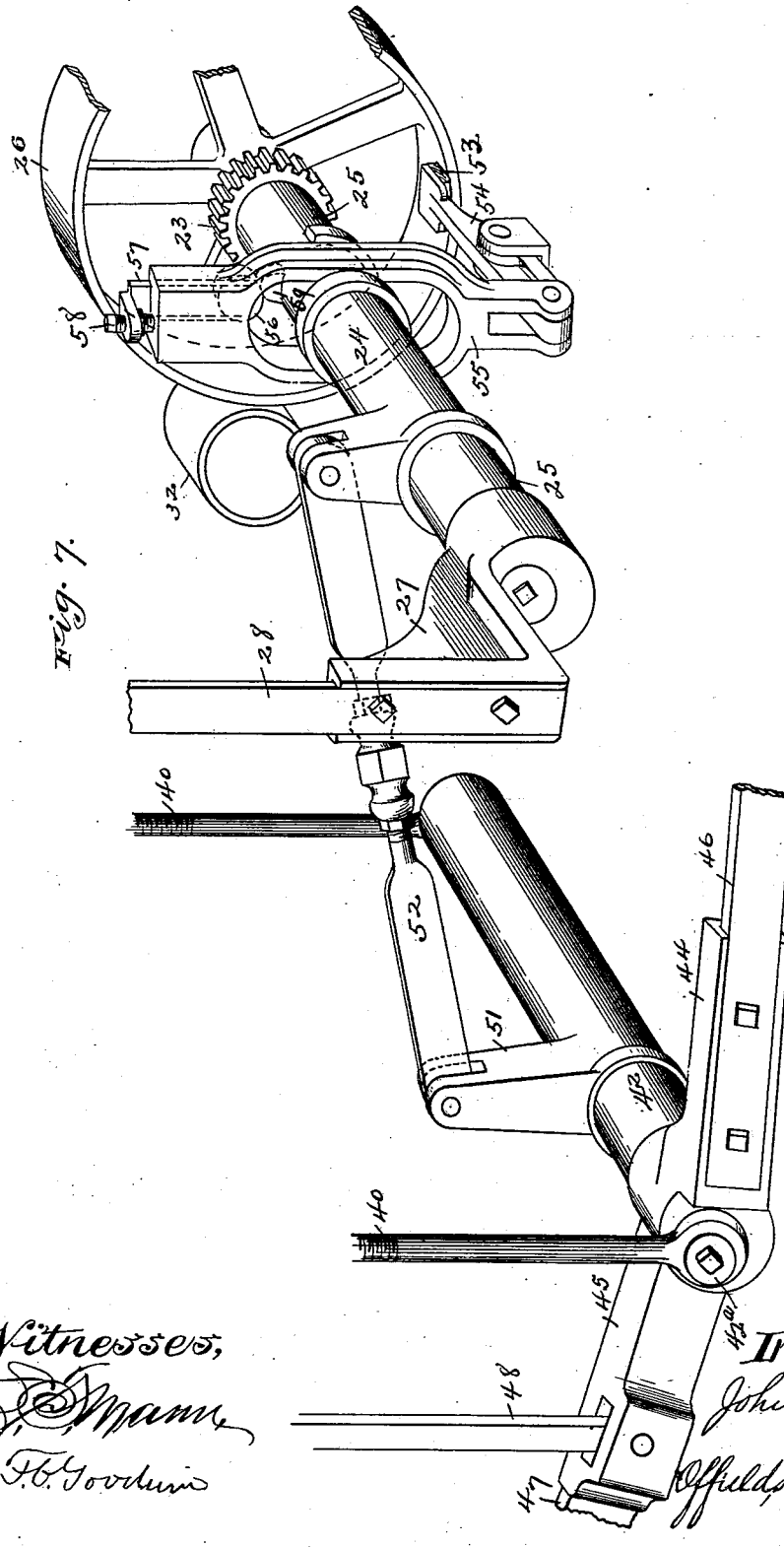

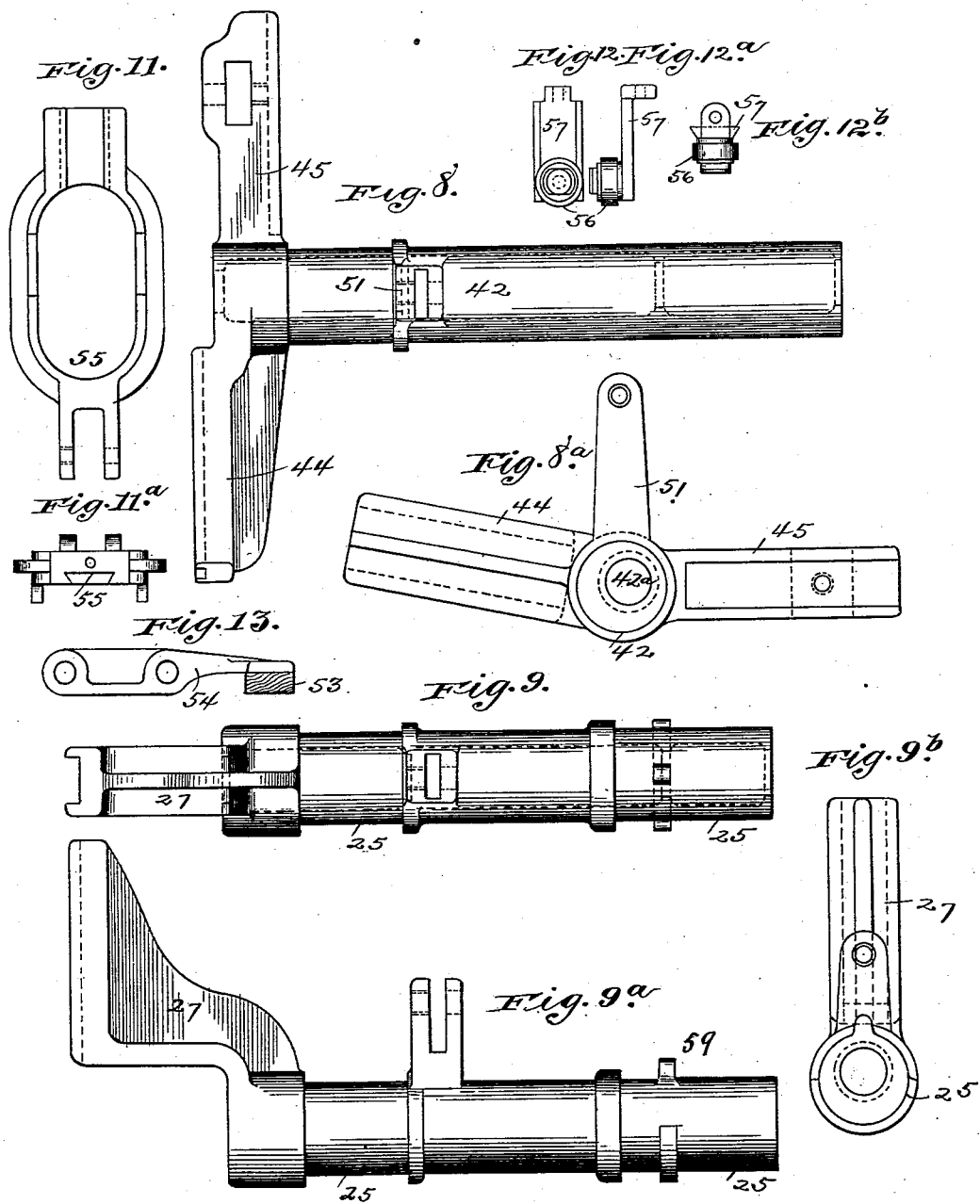

(No Model.) 7 Sheets—Sheet 7.
J. R. THOMAS.
JOINTING MACHINE
No. 563,097. Patented June 30, 1896.
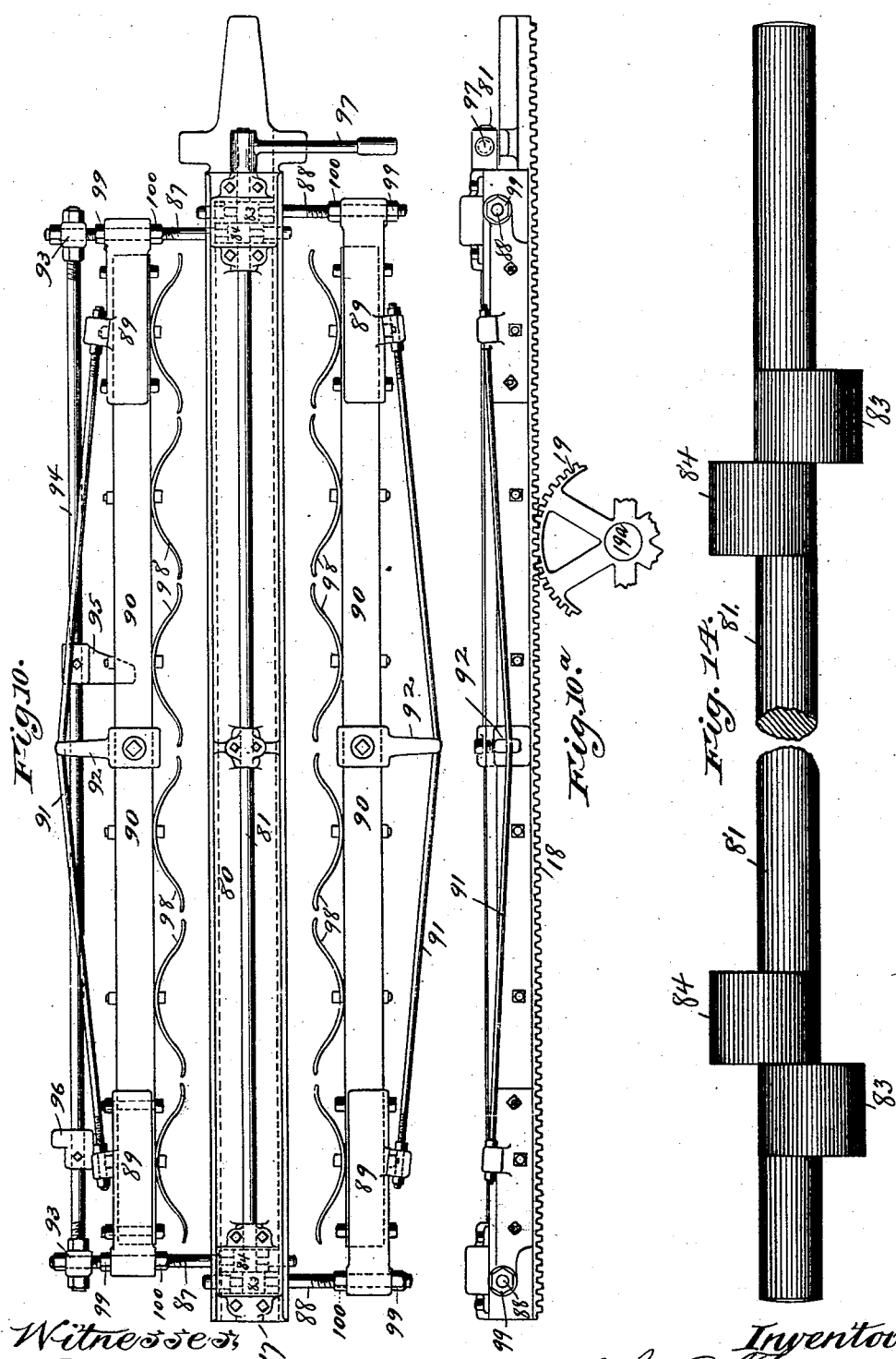

UNITED STATES PATENT OFFICE.

JOHN R. THOMAS, OF BELOIT, WISCONSIN, ASSIGNOR TO THE BERLIN MACHINE WORKS, OF SAME PLACE.

JOINTING-MACHINE.

SPECIFICATION forming part of Letters Patent No. 563,097, dated June 30, 1896.

Application filed March 5, 1894. Serial No. 502,352. (No model.)

*To all whom it may concern:*

Be it known that I, JOHN R. THOMAS, of Beloit, Wisconsin, have invented certain new and useful Improvements in Jointing-Machines, of which the following is a specification.

This invention relates to a machine which is primarily intended for tonguing and grooving lumber in order to prepare it for gluejointing; but the invention is not confined to a jointing or matching machine, as many of the important features thereof may be employed in a machine for otherwise dressing or finishing lumber either upon its surfaces or edges.

The salient features of the invention relate, first, to a novel provision for moving the cutter-head, in order to permit the return of the traveling bed or carriage with the material free of contact from the cutter-head; second, to a novel construction of gearing for effecting the reciprocation of the carriage or bed; third, to a novel construction of brake, and, fourth, to certain structural features and combinations of parts whereby the capacity and effectiveness of the machine are increased.

In the embodiment of my invention which is illustrated in the accompanying drawings there is employed a stationary framework upon which are mounted and suitably driven the cutter-heads, the gearing for driving the cutter-heads and effecting the reciprocation of the carriage, and a brake mechanism. The cutter-heads are mounted in suitable ways wherein they may be moved vertically in order to bring the cutters into operative position, and to depress them so as to permit the return of the carriage with the material out of contact with the cutting-knives. The carriage is preferably driven by a positive gearing, a rack and gear being shown in the drawings, and suitable provision is made for preserving the operative engagement of the gearing by which the carriage is driven when the cutter-head is depressed, this being rendered necessary by the fact that the mechanism for adjusting the cutter-head is connected with the gearing which effects the reciprocation of the carriage. There is also a brake mechanism, which is connected with the devices for raising and lowering the cutter-heads. Certain features of construction of the carriage itself are new, and consist in the provision of means for clamping the work upon both sides of the carriage, and for connecting the clamping mechanisms upon opposite sides, so that the work may be secured to or released from the carriage on opposite sides simultaneously.

In the accompanying drawings, Figure 1 is a perspective view of the machine from the operating side. Fig. 2 is a plain view. Fig. 3 is a side elevation from the opposite side of the machine to that shown in Fig. 1. Fig. 4 is a rear end elevation. Figs. 5 and 6 are respectively a side elevation and a plan view showing in detail the means for connecting the clamping mechanism. Fig. 7 is a broken perspective view showing the mechanism for elevating and depressing the cutter-head and for applying the brake. Figs. 8 to 14 are detail views of various parts which will be hereinafter identified in the detailed description.

In the drawings, 15 represents the supporting-frame of a construction suitable for this class of machines. On the top of this frame are formed the slideways 16 for the carriage 17, which will be described later. Said carriage is provided with the rack 18, which is enmeshed with a large driving-gear 19, mounted on a shaft $19^a$, journaled transversely of the frame. The gear 19 is driven from the pinion 20, mounted on a short shaft 21, which carries a gear 22, enmeshed with a pinion 23 on the shaft 24, which has eccentric-sleeve bearings 25. This shaft also carries an intermediate friction-gear 26, and to one end of the sleeve is secured an extension or bracket 27, to which is fitted a shipping-lever 28 for stopping the carriage on the reverse movement.

29 represents a friction driving-shaft, and 30 a friction reverse-shaft, on which are mounted, respectively, the friction driving and friction reverse pulleys 31 and 32. The shafts 29 and 30 are mounted, respectively, on bearings $29^a$ $30^a$, Fig. 1. On each side of the frame are the vertical slideways 33 and 34, formed in brackets or housings 35 and 36.

37 and 38 represent the slide-blocks for the cutter-head bearings, the latter being marked 39, and having also a lateral adjustment effected by the threaded shafts $39^a$ and hand-wheels 39[b]. The slide-blocks 37 and 38 are adjusted vertically by means of the threaded rods 40, which have a bearing in the slide-blocks, engaging internal threads of the hand-wheels 41. The lower ends of rods 40 are connected to eccentric-studs 42[a] on the sleeve 42, which has its bearing upon the shaft 43 in the construction shown, although instead of the sleeve an eccentric-shaft might be employed. The sleeve 42 has the laterally-extending arms 44 45 secured therewith, and to the arm 44 is attached the treadle 46, and to the arm 45 is attached the counterweight-lever 47. A latch 48 is pivoted at its lower end in the arm 45, and its upper end is offset, shouldered, or otherwise suitably formed to engage a slotted shelf 49, the latch being normally held in position to engage the shelf by the spring 50.

The purpose of the construction above described is to enable the use of cutters of different diameters by manually adjusting the cutter-head bearings by means of the hand-wheel. The foot-treadle affords means for elevating the cutter-head manually, the latch automatically secures it in its elevated position, and the counterweight acts positively to cause it to descend when the latch is released.

On the sleeve 42 is the perforated lug or stud 51, and a connecting-strap 52, pivoted to said lug, transmits the partial rotative movement of said sleeve to the sleeve 24, carrying the intermediate friction-gear 26. The effect of this movement is to impinge the intermediate friction-gear upon the driving-pulley 31 or the reversing-pulley 32. Therefore, the effect of the depression of the treadle operates to lift the cutter-head into position for action and also to set the carriage in motion through the friction driving-gear above described.

The intermediate friction-gear, as shown in Fig. 7, has an internal brake flange or surface, to which are applied the brake-shoes 53, carried on a pivoted brake-lever 54. To this brake-lever 54 is pivotally connected an eccentric-strap 55, which embraces the sleeve 24 and carries the vertical adjustable roller 56 on the sliding block 57, the latter being controlled by the set-screw 58. The sleeve 24 has a stud or cam 59 in such position that when the sleeve is rocked through the link, as previously described, such stud or cam will engage the roller carried by the eccentric-strap 55, lift the latter, and, rocking the brake-lever 54 upon its pivot, apply the brake-shoe to the intermediate friction-pulley.

An additional or alternative means for lifting the cutter-head, reversing the gearing, and applying the brake is provided in the hand-lever 28, arranged in a vertical position and having its lower end secured to the casting 27, secured to the sleeve 24. The friction-gears are driven from the main driving-shaft 62, provided with the usual tight and loose pulleys 63 64. This shaft carries the pulleys 65 66, and a straight belt is carried from pulley 65 to a cone-pulley 67, mounted on the friction driving-shaft 29. A cross-belt 68 is carried from the pulley 66 to the pulley 69 on the reverse-shaft 30. The driving-shaft 62 also carries the driving-pulleys 70 71, which drive the cutter-heads from which belts 72 73 are run to the pulleys 74 75 on the cutter-head shafts 76 77. The cutter-heads are marked 78 79, and are adapted to operate on the opposite edges of the material clamped upon the carriage, which latter and its operation will now be described.

The carriage consists of a long block or body portion 80, fitted to slide on the ways 16 of the frame, and which is driven by the rack 18 and gear 19, as previously described. A shaft 81 is journaled in bearings in this block parallel thereto, and this shaft has at each end the oppositely-thrown eccentrics 83 84. Loops or straps 85 86 inclose these eccentrics, and these loops have rigidly connected therewith, respectively, the rods 87 88. Said rods are threaded toward their outer ends and pass through casting 89, connected by the clamping-bars 90, extending parallel to the central block or body 80. The castings are connected by the truss-rods 91, tensioned over the struts 92, secured to the middles of the clamping-bars 90. Said clamping-bars are preferably constructed from a rectangular iron girt securely bolted to the cast-iron pieces. By means of the truss-rods the middles of the clamping-bars are stiffened, which prevents their bending in the operation of clamping the material upon the sides of the block. The rods 87 are extended a suitable distance through the casting to afford a support for depending brackets 93, which carry the shipping-rod 94. On the shipping-rod are secured the reversing-dog 95 and the stopping-dog 96. To the end of the shaft 81 is secured the operating-lever 97, by which the clamping-bars may be simultaneously moved toward or away from the central block 80. The clamping-bars carry the clamping-springs 98, which are adapted to engage the material upon its outer edge, forcing its inner edge in close contact with the central block. The rods 87 and 88 pass through apertures in the central block, thus forming guides for the rods, and the casting carrying the clamping-bars may be set at the desired position upon the rod by the nuts 99 100, turned upon the threaded portions of the rod on opposite sides of said castings.

The complete operation of the machine is as follows: The material will be clamped upon the carriage, the driving-belt put in motion, and the cutter-head placed in operative position by depressing the foot-treadle or moving the hand-lever. This movement also effects the throwing into gear of the intermediate friction and the driving friction pulley, whereupon the carriage begins its forward movement, the cutters operating upon the edges of the two pieces of material clamped upon the opposite sides of the central block of the carriage. At the end of the forward movement the reversing-dog engages the shipping-lever 60, and simultaneously therewith the dog 96 engages the upper end of the latch, releasing it from its engagement with the shelf, and the counterweight-lever will cause the cutter-heads to descend, and, in conjunction with the action of the reversing-dog upon the operating-lever, the sleeves carrying the eccentrics will be rocked, throwing the intermediate friction-pulley out of contact with the driving-pulley and into contact with the reversing-pulley. Upon the instant of release of the intermediate pulley the brake will be applied to its rim, and as the sleeve carrying the brake-operating cam is rocked farther and the intermediate friction-pulley comes into contact with the reversing friction-pulley the brake is released and the return of the carriage sets in. At the conclusion of this movement the finished work is removed, the fresh material clamped in position, and the operator again sets the machine in motion by depressing the foot-treadle, thus raising the cutter-heads into operative position, in which they are locked automatically by the spring-actuated latch.

I claim—

1. In a woodworking-machine of the class described, the combination with a reciprocating carriage, of a vertically-movable cutter-head, means for reciprocating the carriage, a latch for holding the cutter-head in its elevated position and a tripping mechanism to release the latch to permit the lowering of the cutter-head, substantially as described.

2. In a woodworking-machine of the class described, the combination with a reciprocating carriage, of a vertically-movable cutter-head, gearing for reciprocating the carriage in both directions and a shifting mechanism for reversing the gearing, and means operated by said shifting mechanism to lift the cutter-head to its operative position, substantially as described.

3. In a woodworking-machine of the class described, the combination with a reciprocating carriage, of a vertically-movable cutter-head, friction-gearing for driving the carriage, said friction-gearing comprising a friction driving and a friction reverse gear, an intermediate gear eccentrically mounted and arranged to be shifted into contact with the one or the other of said gears and a shifting mechanism comprising a foot-treadle and said foot-treadle being connected with and adapted to elevate the cutter-heads, substantially as described.

4. In a woodworking-machine of the class described, the combination with cutter-heads mounted in bearings having both lateral and vertical movement, vertically-movable slide-blocks supporting the bearings, rods connected to the slide-blocks, an eccentric to which the rods are connected, a foot-treadle for operating the eccentric, to elevate the cutter-heads, a latch for sustaining the cutter-heads in the elevated position, and a reciprocating carriage adapted to trip the latch during its traverse, substantially as described.

5. In a woodworking-machine of the class described, the combination with a reciprocating carriage, friction-gearing for effecting the reciprocations thereof, said friction-gearing having an intermediate gear-wheel eccentrically mounted, a cutter-head adapted for vertical adjustment, an eccentric for raising the cutter-head, a foot-treadle for operating the eccentric and a counterweight for lowering the cutter-head and shifting the intermediate gear, substantially as described.

6. In a woodworking-machine of the class described, the combination with a reciprocating carriage, friction-gearing for effecting the reciprocation thereof, said friction-gearing having an intermediate gear-wheel eccentrically mounted, cutter-heads adapted for vertical adjustment independent of each other, an eccentric for raising the cutter-heads, a lever for operating the eccentric and a counterweight for lowering the cutter-heads and shifting the intermediate gear, substantially as described.

7. In a woodworking-machine of the class described, the combination with a reciprocating carriage, friction-gearing for effecting the reciprocations thereof, said friction-gearing having an intermediate gear-wheel eccentrically mounted, a cutter-head adapted for vertical adjustment, an eccentric for raising the cutter-head, a foot-treadle for operating the eccentric, means for locking the cutter-head in its raised position, a dog secured with the carriage whereby to release the locking mechanism, and a counterweight for lowering the cutter-head and shifting the intermediate gear, substantially as described.

8. In a woodworking-machine of the class described, the combination with a reciprocating carriage, friction-gearing for effecting the reciprocations thereof, said friction-gearing having an intermediate gear-wheel eccentrically mounted, a cutter-head adapted for vertical adjustment, an eccentric for raising the cutter-head, a foot-treadle for operating the eccentric and a spring-controlled lever having a shoulder thereon, said shoulder adapted to engage a bracket to lock the cutter-head in its raised position, a dog secured with the carriage adapted to engage the lever to release the shoulder from the bracket and a counterweight for lowering the cutter-head and shifting the intermediate gear, substantially as described.

9. In a woodworking-machine of the class described, the combination with a reciprocating carriage, of gearing for reciprocating said carriage, said gearing comprising two driving-pulleys and an intermediate pulley adapted to be shifted into driving contact with either of said pulleys at will, said intermediate gear or pulley having a brake-surface and a pivoted brake adapted to be engaged with the intermediate pulley during its shifting movement, substantially as described.

10. In a woodworking-machine of the class described, the combination with a reciprocating carriage, of gearing for reciprocating said carriage, said gearing comprising a rack, a train of gears, two driving-pulleys and an intermediate pulley adapted to be shifted into driving contact with either of said pulleys at will, an eccentric-sleeve bearing for said intermediate gear and a pivoted brake adapted to be operated by the eccentric whereby to apply the brake to the gear, substantially as described.

11. In a woodworking-machine of the class described, the combination with a reciprocating carriage, of gearing for reciprocating said carriage, said gearing comprising a rack, a train of gears, two driving-pulleys and an intermediate pulley adapted to be shifted into driving contact with either of said pulleys at will, an eccentric-sleeve bearing for said intermediate gear, a cam on said eccentric-sleeve, a strap surrounding the sleeve and a pivoted brake operated through the strap, cam and eccentric whereby to apply the brake to the gear during the shifting movement, substantially as described.

12. In a woodworking-machine of the class described, the combination with a reciprocating carriage, of gearing for reciprocating said carriage, said gearing comprising a rack, a train of gears, two driving-pulleys and an intermediate pulley adapted to be shifted into driving contact with either of said pulleys at will, an eccentric-sleeve bearing for said intermediate gear, a cam on said eccentric-sleeve, a strap surrounding the sleeve, a roller adjustably secured with the strap, and a pivoted brake operated through the strap, roller, cam and eccentric whereby to apply the brake to the gear during the shifting movement, substantially as described.

13. In a machine of the class described, the combination with a brake comprising a gear having a brake-surface, an eccentric-sleeve bearing for said gear, a cam on said sleeve, a strap secured in the path of said cam, a pivoted brake secured to said strap, whereby the rocking of the sleeve causes the cam to actuate the strap to set the brake, substantially as described.

14. In a machine of the class described, the combination with a carriage comprising a central block, of clamping-bars laterally movable with relation to the block, an operating-shaft having eccentrics, straps having elongated bearings surrounding said eccentrics, rods secured with the straps, said rods passing through apertures in the central block and having their outer ends threaded and adjustably connected with the clamping-bars and nuts upon said rods whereby the bars may be moved to and from the central block by the operation of the shaft and may be adjusted manually to and from said block by means of said nuts, substantially as described.

JOHN R. THOMAS.

Witnesses:
T. C. HENDLEY,
R. D. JACOBS.